Oct. 9, 1923.
J. F. MYERS
1,470,096
PISTON PACKING RING
Filed Dec. 11, 1922
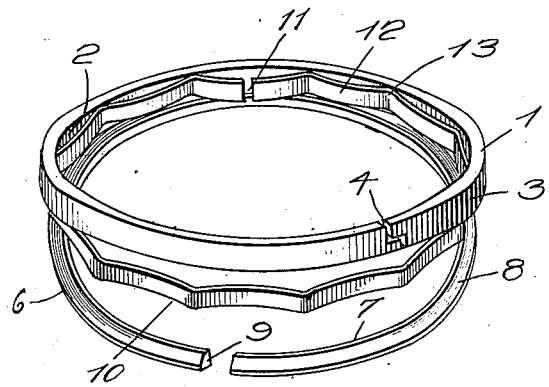
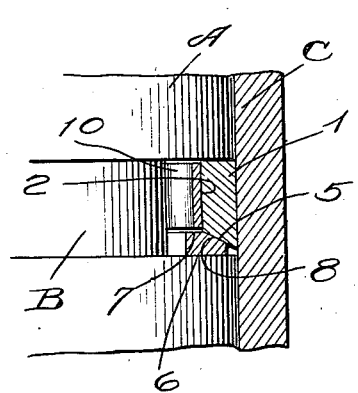
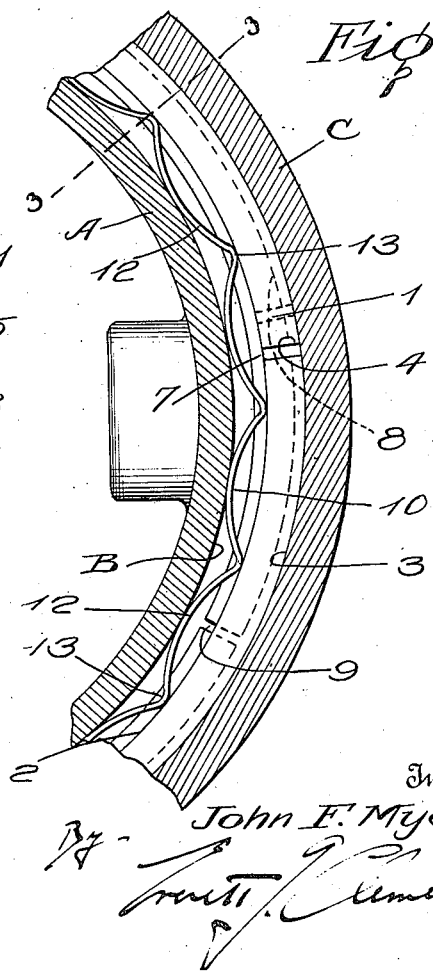
Inventor
John F. Myers
By
Attorney Patented Oct. 9, 1923.

1,470,096

UNITED STATES PATENT OFFICE.

JOHN F. MYERS, OF DETROIT, MICHIGAN.

PISTON PACKING RING.

Application filed December 11, 1922. Serial No. 606,159.

*To all whom it may concern:*

Be it known that I, JOHN F. MYERS, a citizen of the United States, residing at Detroit, in the county of Wayne and State of Michigan, have invented certain new and useful Improvements in Piston Packing Rings, of which the following is a specification.

My invention relates broadly to improvements in piston packing and particularly to that type of packing employed in single acting engines.

Engines of this general class, of which the internal combustion engine forms the larger part, depend, for their efficiency, upon the continued proper fit of the piston and its packing within the engine cylinder. Uneven wear of the cylinder walls is inevitable in most cases, for obvious reasons, and packing rings such as have been heretofore employed in this connection have failed to compensate for such uneven wear of the cylinder walls, with the consequent loss in efficiency of the engine and fouling of upper engine parts with excess oil.

It is therefore the primary object of my improved packing ring to overcome such disadvantages and to effect a perfect seal between the piston and its cylinder wall at all times and positions of the piston in the cylinder, irrespective of such unevenness in wear as may be traversed in the stroke.

It is also essential and therefore an object of my invention, that the packing ring should yield readily wherever wear in the cylinder wall is encountered, in order that the rubbing or peripheral surface of the ring shall bear evenly against the cylinder wall throughout its entire length and thereby effect uniform tension and wear on the ring.

A further object of my invention is to prevent the passage of oil and gas back of the packing ring, under such conditions as have been heretofore explained, and to prevent rotation of the ring or its respective parts in use.

Other objects and advantages of my improved piston packing will be more apparent from the following detailed description, in connection with the accompanying drawings; wherein:

Figure 1 is an exploded or imaginary view of my piston packing showing the various parts and their relation to each other.

Fig. 2 is a fragmentary view of a piston equipped with one of my improved packing rings and illustrates the functioning of the component parts of the ring in use, and Fig. 3 is a cross section on line 3—3 of Fig. 2.

Referring to the drawing wherein similar reference characters indicate similar parts, A represents a piston of any well known or approved construction provided with a circumferential packing groove B, and C indicates a wall of the cylinder in which the piston A operates.

The piston packing, shown partly assembled in Fig. 1, is adapted to fit within the circumferential groove B in the piston A, as is clearly shown in Figs. 2 and 3, and comprises a thin annular packing ring 1, having flat inner and outer peripheries 2 and 3 respectively. The ring 1 is split at 4, as is the general practice, and the lower edge is beveled to form an inclined surface 5 extending inwardly from the outer peripheral surface 3, to be explained later on.

A second ring 6, which I will call the compensating ring, is of slightly less diameter than the packing ring 1 and is formed with a flat upper surface 7 and a beveled surface 8 which extends from the surface 7 to the outer peripheral wall of the ring 6. The angle of this beveled surface 8 is milled to coincide with the beveled lower edge 5 of the packing ring 1 and is split at 9, as is clearly indicated in Fig. 1.

Mounted upon the flat upper surface 7 of the compensating ring 6, and engaging the inner peripheral wall 2 of the packing ring 1, is a ribbon spring 10. This ribbon spring 10 is preferably constructed of high grade steel and of the desired gauge and width to meet the particular requirements of the job to be equipped. It is essential however that the width of this spring be approximately that of the inner wall 2 of the packing ring 1.

The spring 10 is bent at intervals, intermediate its ends 11, to provide alternate piston and packing ring bearing surfaces and apices 12 and 13, respectively. The apices 13 of the bends 12 are formed as close together as is practical in order to provide uniform tension throughout the entire length of the packing ring 1 and operate to maintain all portions of the ring 1 in contact with the cylinder wall irrespective of unevenness in wear.

In use, the relatively thin packing ring 1 is thus maintained in positive contact with the cylinder wall under a predetermined pressure to meet the particular requirements of the engine, as will be readily understood from the foregoing. It will also be noted that leakage behind the ring into the packing groove B is prevented by the co-operation of the beveled surface 8 of the compensating ring 6 with the beveled surface 5 of the packing ring 1.

These two rings 1 and 6 function, through the engaging beveled surfaces 5 and 8, to wedge between the upper and lower walls of the packing groove B under the spring tension of the compensating ring 8. Rotation of the packing ring 1 and the compensating ring 6 is thus prevented in use and a perfect seal maintained between the piston and its cylinder wall under all conditions.

What I claim is:

1. Piston packing comprising a split ring having parallel inner and outer peripheries and a beveled lower edge, a compensating ring having a flat upper surface and a beveled surface coinciding with the beveled lower edge of said packing ring, and a spring element mounted on the flat upper surface of said compensating ring and adapted to bear against the cylindrical inner periphery of said packing ring, substantially as described.

2. Piston packing comprising a relatively thin annular split ring having a beveled lower edge, a compensating ring having a portion of its upper edge beveled to receive the beveled lower edge of said packing ring and a portion extending rearwardly therefrom, and a ribbon spring of substantially the same width as said packing ring adapted to exert pressure against the rear wall thereof and rest upon the rearward extension of said compensating ring, substantially as described.

3. A piston packing comprising a relatively thin annular split ring having a beveled lower edge, a spring element in contact with said ring and adapted to exert uniform pressure throughout the full extent of the width of the rear wall thereof, and a split compensating ring of less diameter than said packing ring adapted to support said spring and having a portion of its upper edge beveled to receive the lower beveled edge of said packing ring, substantially as dscribed.

In testimony whereof I affix my signature.

JOHN F. MYERS.